United States Patent
Soryal

(10) Patent No.: US 11,166,151 B2
(45) Date of Patent: Nov. 2, 2021

(54) FACILITATION OF SECURITY FOR ELECTRONIC SUBSCRIBER IDENTITY MODULE FOR 5G OR OTHER NEXT GENERATION NETWORK

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 4 days.

(21) Appl. No.: 16/720,710

(22) Filed: Dec. 19, 2019

(65) Prior Publication Data

US 2021/0195402 A1    Jun. 24, 2021

(51) Int. Cl.
| | |
|---|---|
| H04W 4/00 | (2018.01) |
| H04W 8/18 | (2009.01) |
| H04W 60/00 | (2009.01) |
| H04W 12/30 | (2021.01) |
| H04W 12/72 | (2021.01) |

(52) U.S. Cl.
CPC ........... *H04W 8/183* (2013.01); *H04W 12/35* (2021.01); *H04W 12/72* (2021.01); *H04W 60/00* (2013.01)

(58) Field of Classification Search
CPC ... H04W 8/183; H04W 12/72; H04W 12/062; H04W 12/06; H04W 12/068
See application file for complete search history.

(56) References Cited

U.S. PATENT DOCUMENTS

| | | | | |
|---|---|---|---|---|
| 2006/0205434 A1* | 9/2006 | Tom | ........................ | H04W 8/26 455/558 |
| 2009/0029680 A1* | 1/2009 | Fang | ...................... | H04L 51/36 455/412.2 |
| 2010/0099403 A1* | 4/2010 | Kim | ..................... | H04W 8/183 455/432.1 |
| 2012/0329521 A1* | 12/2012 | Jacobs | .................. | H04W 12/35 455/558 |
| 2013/0303117 A1* | 11/2013 | Tsuda | .................... | H04W 8/205 455/406 |
| 2017/0171189 A1* | 6/2017 | Byszio | ................ | H04L 63/0815 |

* cited by examiner

*Primary Examiner* — Shantell L Heiber
(74) *Attorney, Agent, or Firm* — Amin, Turocy & Watson, LLP

(57) ABSTRACT

Electronic subscriber identity modules (eSIM) can be more susceptible to hackers and more vulnerable than physical subscriber identity modules. The current disclosure discusses systems and methods to facilitate eSIM security by utilizing a management software application (MSA) hosted on a mobile device. This MSA can cross-reference eSIM registration data with mobile device signature data to determine if the correct user identity is associated with mobile device prior to an eSIM being issued to the mobile device. Additionally, various degrees of data flagging can be utilized to allow an end user to properly address an indication of mobile device vulnerability.

20 Claims, 10 Drawing Sheets

FACILITATION OF SECURITY FOR ELECTRONIC SUBSCRIBER IDENTITY MODULE FOR 5G OR OTHER NEXT GENERATION NETWORK

TECHNICAL FIELD

This disclosure relates generally to electronic subscriber identity modules. For example, this disclosure relates to facilitating security for electronic subscriber identity modules for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to security for electronic subscriber identity modules is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
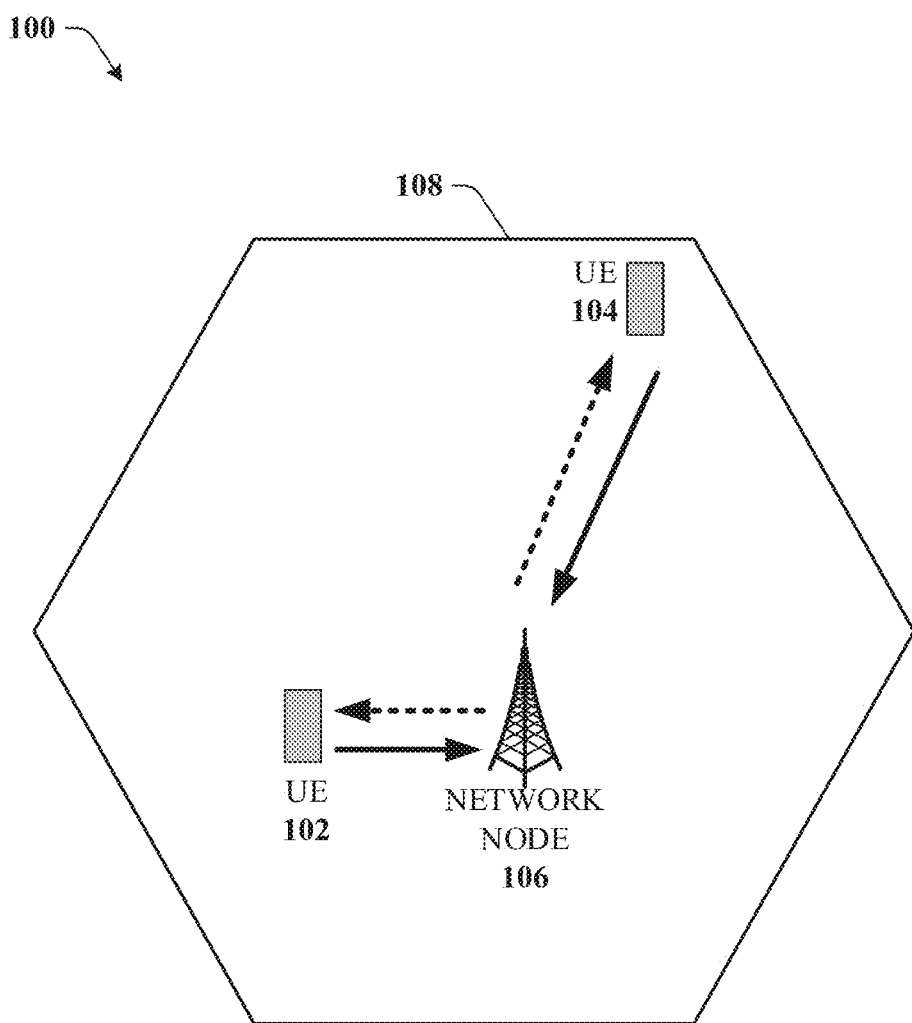
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate security for electronic subscriber identity modules for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate security for electronic subscriber identity modules for a 5G network. Facilitating security for electronic subscriber identity modules for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

An electronic subscriber identity module (eSIM) is an electronic SIM, which is an electronic software version of a physical SIM. However, there are software vulnerabilities that can occur with eSIMs. Common eSIM phone vulnerabilities can comprise: identity theft for initial subscription with used phone, identity theft for initial subscription with unused phone (e.g., just purchased under a same account), falsely claiming phone was lost and asking for duplicate eSIM activation, and/or abandoned/physically compromised internet-of-things (IoT) devices with eSIM. It should be noted that the following discussing can apply to mobile devices and/or IoT devices.

To mitigate the eSIM vulnerabilities, a monitoring software can be an application a mobile device or be built on top of an operating system of the mobile device, to address the aforementioned problems. For example, the monitoring software application (MSA), once installed, can have root access on the mobile device. The carrier can send the eSIM to be downloading to the mobile device along with the MSA. When the phone is rebooted, the MSA can ask for root access permission to be granted, which will allow the MSA to read all of the identifiers (e.g., firmware, hardware, memory, operating system signatures, operation data, installation data, communicating tower, IP address, chat, text, social media, email, web history, auto-filling, etc.) from the phone to attempt to verify a person's name, address, date of birth, marital status, etc. Consequently, during the provisioning process the user can be limited to one geographical area. Thus, a call from the United States can not receive an eSIM for someone located in a different geographical region (e.g., outside of the United States). The MSA can search the phone for the identifiers on a used phone to correlate the data. For example, if a text mentions "happy birthday" on September 7, and finds other text or information to support a person's birthday being on September 7, if the registrant uses a different date, then an flag can be triggered. Consequently, the data procured by the MSA can be used to cross-reference or compare against eSIM registration data. Although the registration may not be denied at this point, the registration can request additional verification data to determine the authenticity of the birth date.

In another embodiment, the MSA can request that a user can his/her identification card and/or face for a positive identification match before an eSIM is issued. If the identification card indicates that a user lives at a specific address, then this address can be cross-referenced against a current location of where the provisioning is occurring. This can prompt additional verification requests. However, if an email can show data that the user purchased a travel ticket to another geographical area for the weekend, then the flag may not be issued. The MSA can communicate with the wireless network.

The MSA can ensure that the carrier send the eSIM profile in a geographically restricted manner (e.g., use the same or nearby tower as when the mobile device was powered-up). The MSA can be in communication with the carrier's network, and when the user attempts to make a call, the eSIM can require a validation code from the MSA. The MSA can therefore positively identify the device's signature.

The MSA can create a new device signature based on usage of the mobile device and/or a profile associated therewith (e.g., websites visited, method of writing, sentence structure, grammar, frequent numbers called, sensors, input signals, etc.). This data can also be ported to new phones. The MSA can constantly keep matching the identity of the mobile device user and line owner via a constructed profile (e.g., social media, email, usernames, addresses, etc.) and also take into consideration family plans and borrowed lines.

When a call is made to the network, if the MSA and eSIM are fraudulently cloned to another phone, the MSA would not positively identity the device signature of the phone because each phone has a unique device signature, thus causing an error. The device signature is an ever-evolving parameter. For instance, today a caller may speak with ten friends, but next month, the user can speak to a different set of friends. For instance, a temperature change can indicate that the phone's eSIM has been copied if the signature of the phone correlates to a geographic location of warm temperatures and yet the request is coming from a geographic location of cold temperatures. Grammatical nuances can also be used to define the signature (e.g., perfect grammar, broker grammar, etc.).

The network node can comprise an MSA manager that can communicate with the MSA on the mobile device to verify that each MSA is unique. The MSA can be a continuous soft authentication system meaning that authentication can be performed over time. For example, if multiple flags have been triggered over a specific period of time, then the user can be restricted and/or prompted to take their mobile device to a mobile device carrier store.

This MSA manager communicates with the individual MSA units in the phones and keep copies/images of the individual MSA units that are installed on the phones. The MSA manager can ensure that there are no duplications or eSIM cloning via reviewing the MSA images, and the MSA manager can download the individual MSA software to phones.

In one embodiment, described herein is a method comprising assessing, by a mobile device comprising a processor, identification data representative of a user identity associated with the mobile device. Based on a result of the assessing the identification data, the method can comprise facilitating, by the mobile device, correlating the identification data to service provider registration data to facilitate registering the mobile device with network devices associated with a service provider identity of a service provider. Additionally in response to a condition associated with the correlating being determined to have been satisfied, the method can comprise prompting, by the mobile device, performance of an action to facilitate provisioning the mobile device with the network devices associated with the service provider.

According to another embodiment, a system can facilitate, receiving, from a mobile device of a wireless network, identification data representative of a user identity associated with the mobile device. The system can comprise receiving, from a network device of the wireless network, service provider registration data representative of a registration of the user identity to use network devices associated with a service provider identity of a service provider. Additionally, in response to the receiving the identification data and the receiving the service provider registration data, the system can comprise comparing the identification data to the service provider registration data.

According to yet another embodiment, described herein is a machine-readable storage medium that can perform the operations comprising receiving identification data representative of a user identity associated with a first mobile device of a wireless network. The machine-readable storage medium can perform the operations comprising receiving service provider registration data representative of a registration of the user identity with network devices of a service provider from a second mobile device of the wireless network. Furthermore, the machine-readable storage medium can perform the operations comprising comparing the identification data to service provider registration data to generate match data as a result of the comparing in response to the receiving the identification data and the receiving the service provider registration data.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 106. The network node (e.g., network node device) can communicate with user equipment (UE), thus providing connectivity between the UE and the wider cellular network. The UE 102 can send transmission type recommendation data to the network node 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102 to the network nodes 106 represents an uplink (UL) communication.

System 100 can further include one or more communication service provider networks 106 that facilitate providing wireless communication services to various UEs, including UE 102, via the network node 106 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 106 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 106). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102, 104 and the network node 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
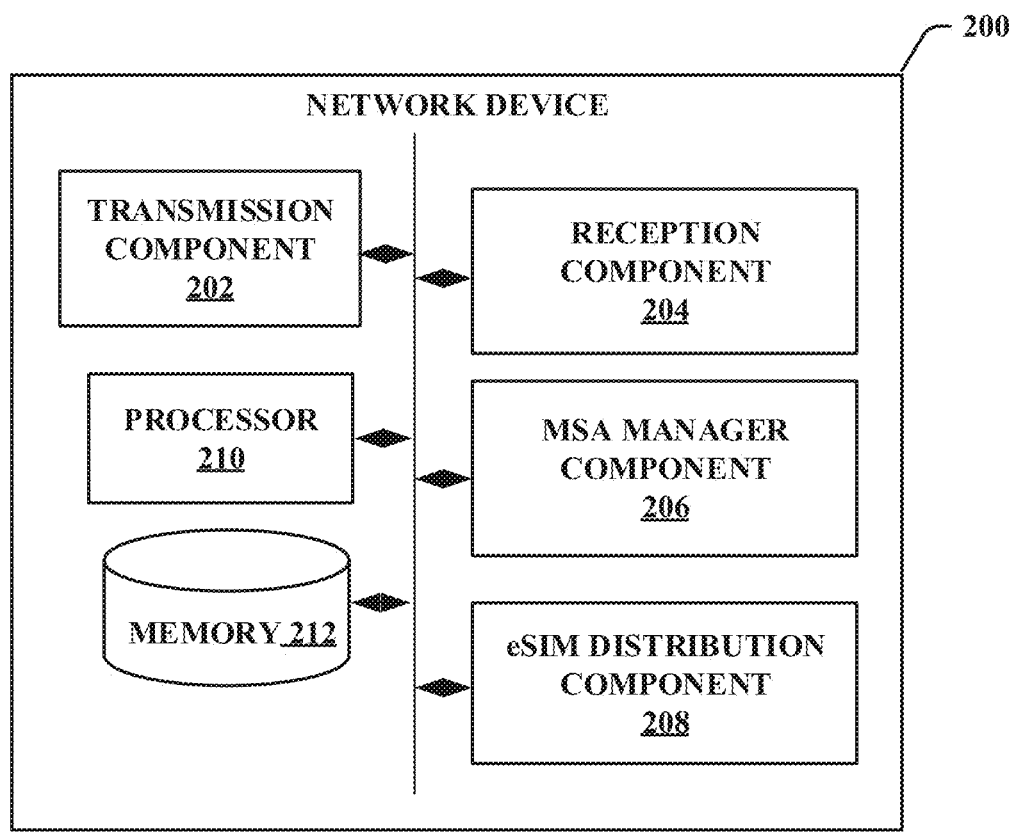
FIG. 2 illustrates an example schematic system block diagram of network device according to one or more embodiments.

Referring now to FIG. 2, illustrated is an example schematic system block diagram of network device 200 according to one or more embodiments. It should be noted that the network device can be hosted at the network node 106 of the wireless network.

The network device 200 can comprise a transmission component 202, a reception component 204, an MSA manager component 206, an eSIM Distribution component 208, a processor 210, and a memory 212, which can all be communicatively coupled. The processor 210 can correspond to a processing component from a plurality of processing components. Aspects of the processor 210 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processor 210 can also include memory 212 that stores computer executable components and instructions.

The transmission component 202 can be operable to transmit radio signals to other land mobile radio devices (e.g., UE 102). The reception component 204 can be operable to receive radio signals from the other land mobile radio devices (e.g., UE 102). The MSA manager component can communicate with the MSA on various mobile devices (e.g., UE 102, 104) to verify that the MSAs are unique. For example, the same MSA should be not found to be on multiple devices by the MSA manager component 206. The MSA manager can communicate with the individual MSA units on the mobile phones and keep copies/images of the individual MSA units that are installed on the phones. Thus, the network device 200 can send and/or facilitate download of the MSA software to the mobile device via the transmission component 202. For example, after the MSA manager component has generated and/or compared MSA copies to ensure that there are no duplications or eSIM cloning, the eSIM distribution component 208 can send and/or facilitate a downloading of the MSA software to the mobile device (e.g., UE 102).

If the MSA manager component 206 determines that there are duplicate copies of the MSA on multiple mobile devices, then it can send further requests to the multiple devices to try to determine which mobile device the MSA should rightfully belong to and/or terminate an eSIM on any and/or all of the assessed mobile devices. It should be noted that there are additional components and/or functionalities of the network device 200 that are not included in this disclosure for the sake of brevity. However, these additional functions and components (now known and unknown) can fall with the spirit and scope of this disclosure.

Figure 3:
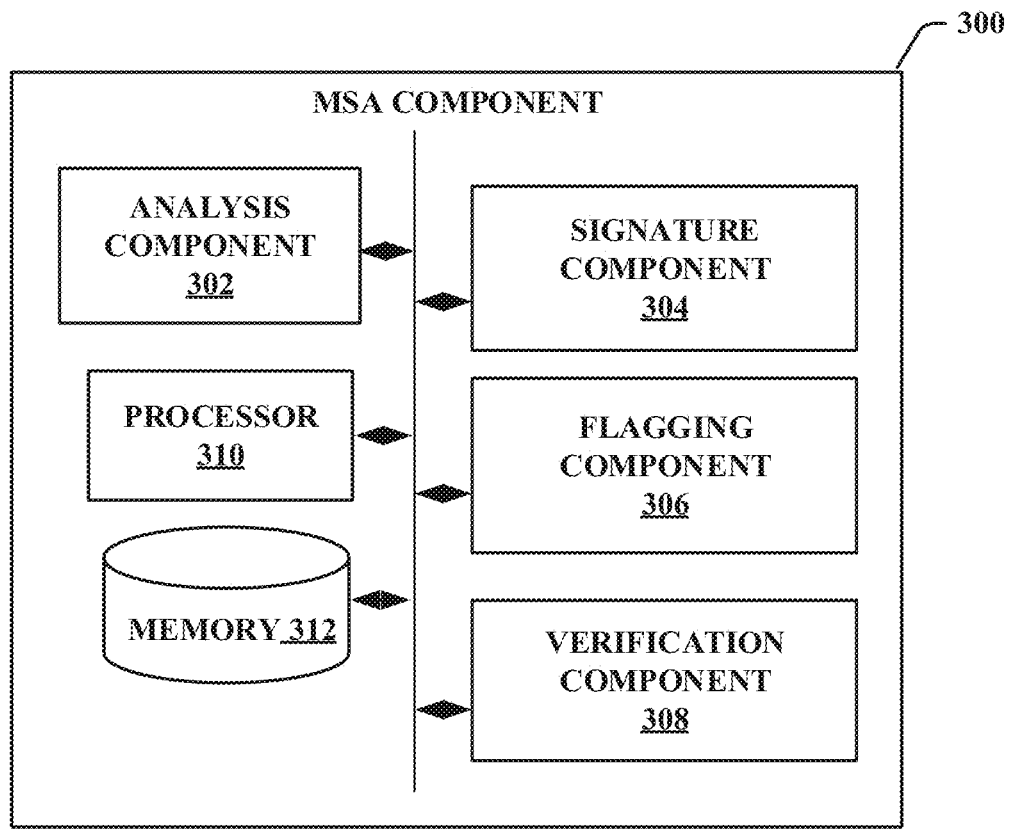
FIG. 3 illustrates an example schematic system block diagram of an MSA component according to one or more embodiments.

Referring now to FIG. 3, illustrated is an example schematic system block diagram of an MSA component 300 according to one or more embodiments. It should be noted that the MSA component 300 can be hosted at the UE 102 of the wireless network.

The MSA component 300 can comprise an analysis component 302, a signature component 304, a flagging component 306, a verification component 308, a processor 310, and a memory 312, which can all be communicatively coupled. The processor 310 can correspond to a processing component from a plurality of processing components. Aspects of the processor 310 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processor 310 can also include memory 312 that stores computer executable components and instructions.

The analysis component 302 can receive and compare eSIM registration data to data generated by the signature component. For example, if the analysis component 302 is comparing geographical data from the registration component (e.g. Chicago) to geographical data of the signature that indicates that the mobile device is currently in Atlanta, then a flag can be issued by the flagging component 306 because the registration data does not match the location of the mobile device (e.g., UE 102). Although the mismatch is not fully dispositive of whether there is some type of fraudulent behavior, the mismatch can prompt for additional questions to the end user, additional matches to be performed, and/or additional information to be verified. Consequently, the verification component 308 can prompt for this additional information. The MSA component 300 can also determine when the eSIM provisioning or termination should occur. For example, three matches with no mismatches need before provisioning two mismatched queries result in an eSIM termination; after one mismatch, two additional questions must be answer correctly consecutively to initiate provisioning. These and other verification rules can be set and/or adjusted by the verification component 308.

The analysis component 302 can compare the registration data to a mobile device signature generated by the signature component 304, wherein the signature is based on usage of the mobile device and/or a profile associated therewith (e.g., websites visited, method of writing, sentence structure, grammar, frequent numbers called, sensors, input signals, etc.). The analysis component 302 can constantly keep matching the signature (e.g., social media, email, usernames, addresses, etc.) of the mobile device to the registration data provided by the user to register for the eSIM. It should also be noted that the embodiments within this application can be relevant to new eSIM provisioning and/or maintaining an already provision eSIM.

Figure 4:
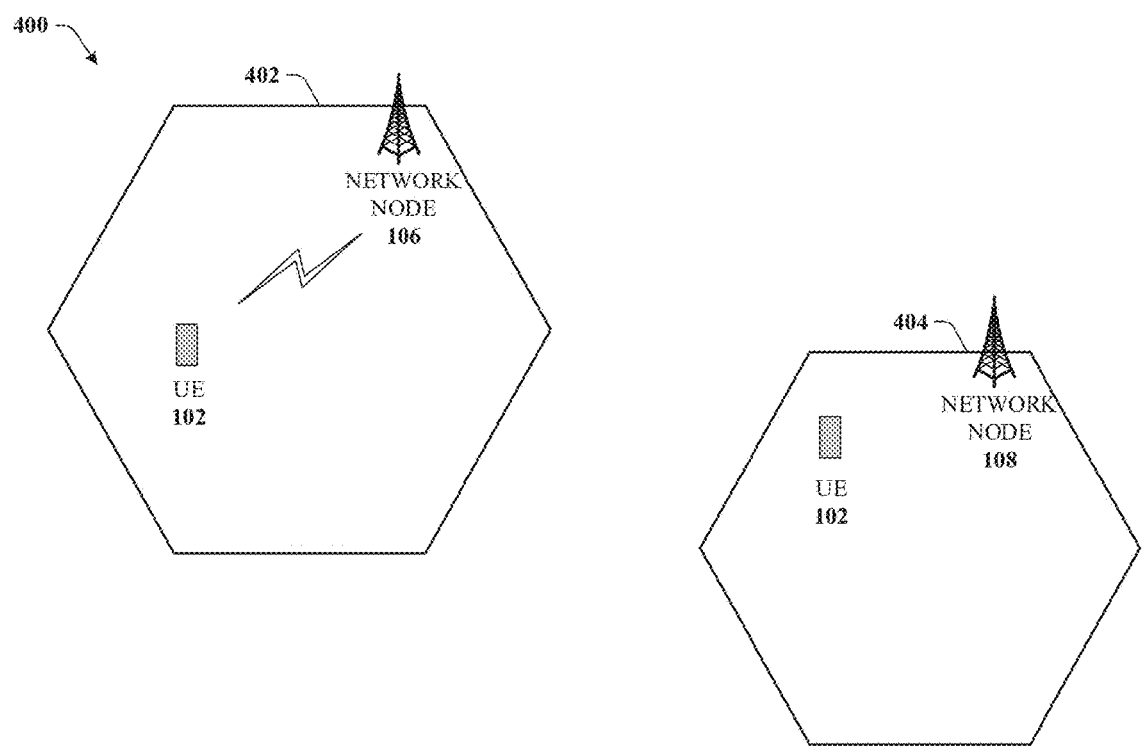
FIG. 4 illustrates an example schematic system block diagram of an eSIM flagging scenario according to one or more embodiments.

Referring now to FIG. 4, illustrated is an example schematic system block diagram of an eSIM flagging scenario 400 according to one or more embodiments. A flag can be generated by the system based on geographic data associated with the UE 102. For example, if the UE 102 signature indicates the UE spends a determined amount of time located within a first geographic area 404 due to the UE 102 connecting to the network node 106, then the signature component 304 can indicate such as part of the UE 102 signature. However, if the UE 102 attempts to register for a new eSIM in a remote geographic area 402 by connecting to the network node 106, the flagging component 306 can flag this attempt based on the mismatch in signature geographic area versus registration geographic area. The flag can prompt the verification component 308 to ask additional questions to verify the there is no nefarious activity such as phone cloning. However, the flag cannot be dispositive of nefarious activity because it could be quite possible that the user of the UE 102 has traveled to the remote geographic area 402 on a vacation.

Figure 5:
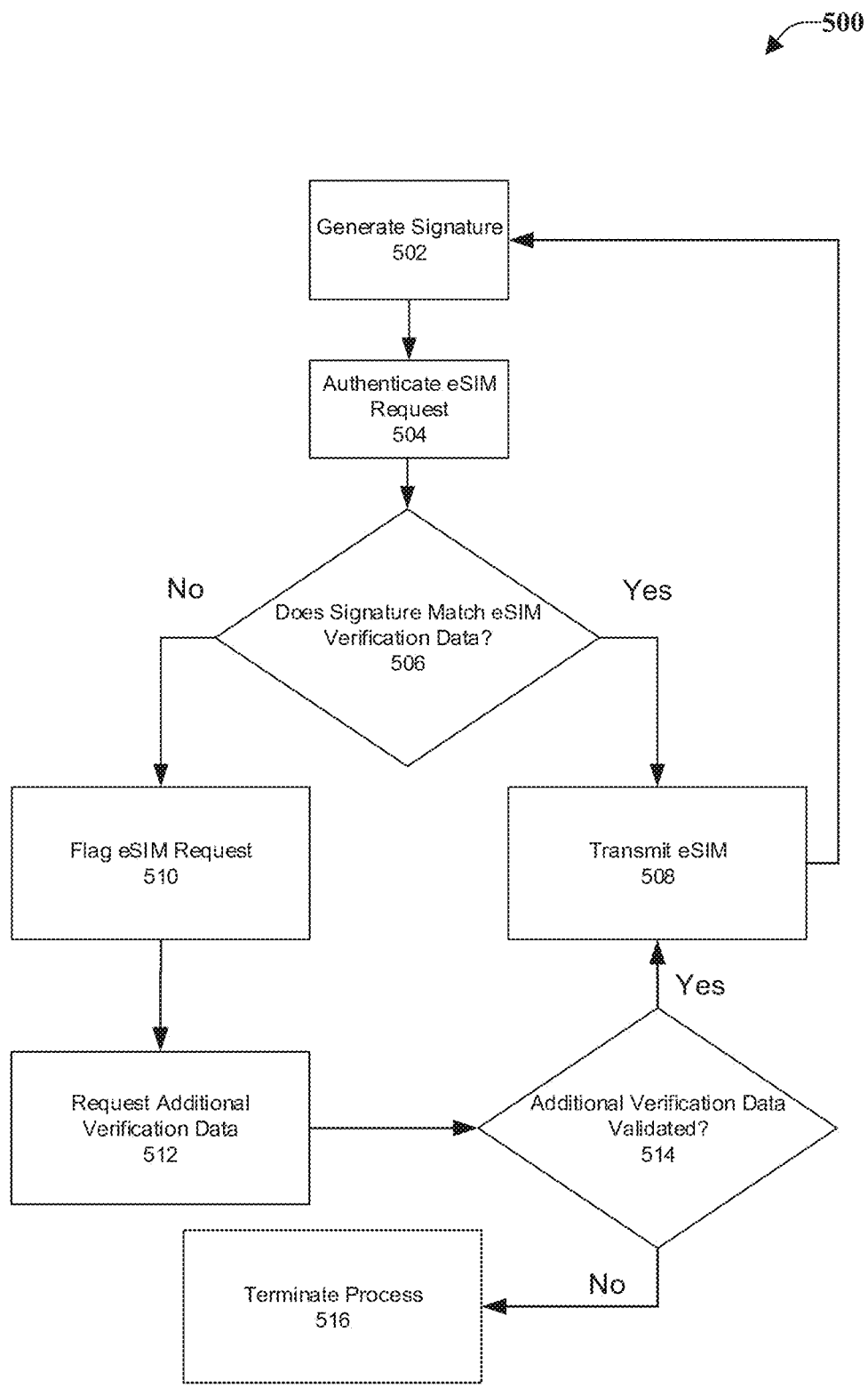
FIG. 5 illustrates an example schematic system flow diagram of facilitating security for eSIMs according to one or more embodiments.

Referring now to FIG. 5 illustrates an example schematic system flow diagram of facilitating security for eSIMs according to one or more embodiments. At block 502, the signature component 304 can generate a signature for the UE 102. In response to a registration request, at block 504, the analysis component 302 can authenticate the registration request via a matching process. At this point, the analysis component 302 can determine if the signature of the UE 102 matches the eSIM registration data at block 506. If the signature does match the eSIM registration data, then the system can eSIM distribution component 208 can transmit and/or maintain the eSIM to the UE 102 at block 508 prior to the system resetting. However, if the signature does not match the registration data, then the eSIM request can be flagged by the flagging component component 306 at block 510, thereby prompting the verification component 308 to request additional verification data at block 512. If the additional verification data is verified at block 514, then the system can transmit the eSIM to the UE 102. However, if the additional verification cannot be validated at block 514, then the eSIM transmission process can be terminated at block 516.

Figure 6:
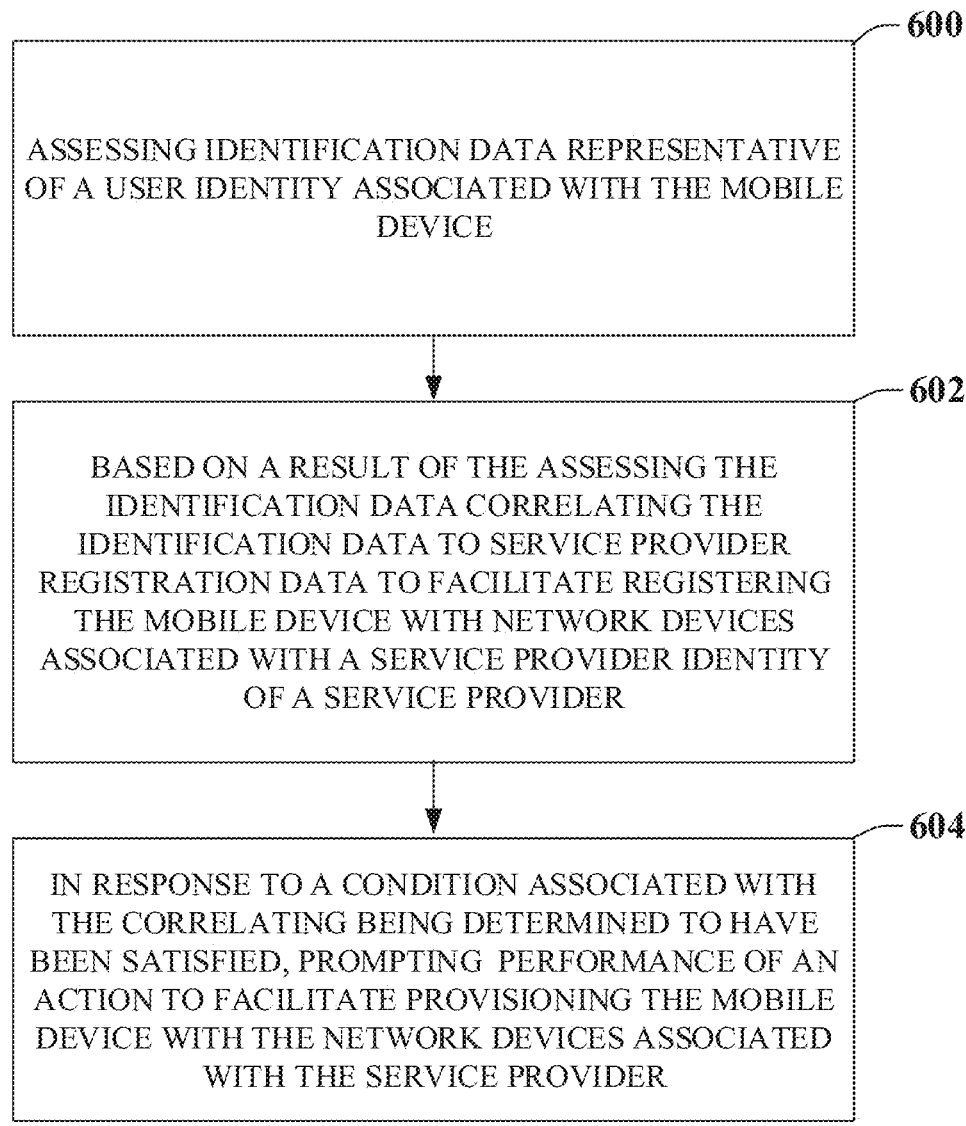
FIG. 6 illustrates an example flow diagram for a method for facilitating security for electronic subscriber identity modules for a 5G network according to one or more embodiments.

Referring now to FIG. 6, illustrated is an example flow diagram for a method for facilitating security for electronic subscriber identity modules for a 5G network according to one or more embodiments.

At element 600, a method can comprise assessing (via the analysis component 302) identification data representative of a user identity associated with the mobile device (e.g., UE 102). Based on a result of the assessing the identification data, at element 602, the method can comprise facilitating correlating (via the verification component 308) the identification data to service provider registration data to facilitate registering the mobile device (e.g., UE 102) with network devices associated with a service provider identity of a service provider. Additionally, in response to a condition associated with the correlating being determined to have been satisfied, at element 604, the method can comprise prompting (via the verification component 308) performance of an action to facilitate provisioning the mobile device (e.g., UE 102) with the network devices associated with the service provider.

Figure 7:
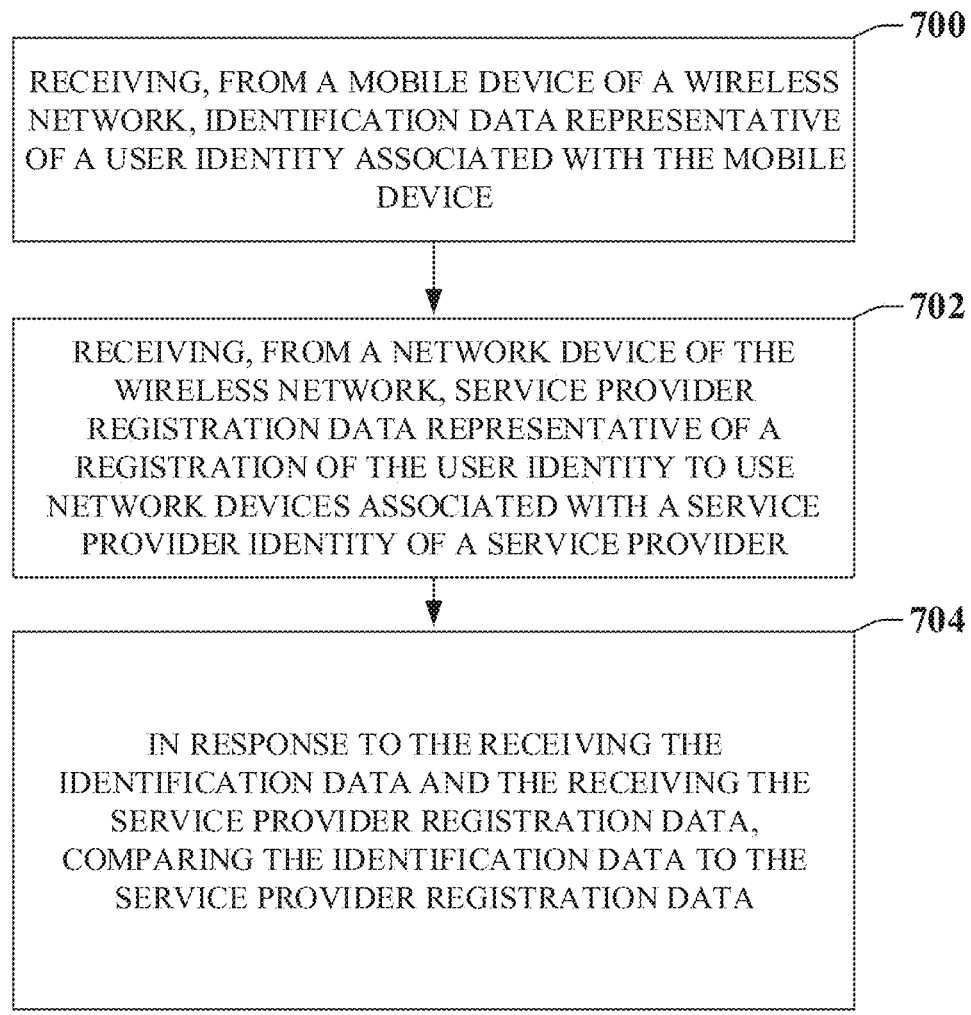
FIG. 7 illustrates an example flow diagram for a system for facilitating security for electronic subscriber identity modules for a 5G network according to one or more embodiments.

Referring now to FIG. 7, illustrated is an example flow diagram for a system for facilitating security for electronic subscriber identity modules for a 5G network according to one or more embodiments.

At element 700, a system can facilitate, receiving, from a mobile device (e.g., UE 102) of a wireless network, identification data representative of a user identity associated with the mobile device (e.g., UE 102). At element 702, the system can comprise receiving, from a network device (e.g., network node 106) of the wireless network, service provider registration data representative of a registration of the user identity to use network devices associated with a service provider identity of a service provider. Additionally, at element 704, in response to the receiving the identification data and the receiving the service provider registration data, the system can comprise comparing (via the analysis component 302) the identification data to the service provider registration data.

Figure 8:
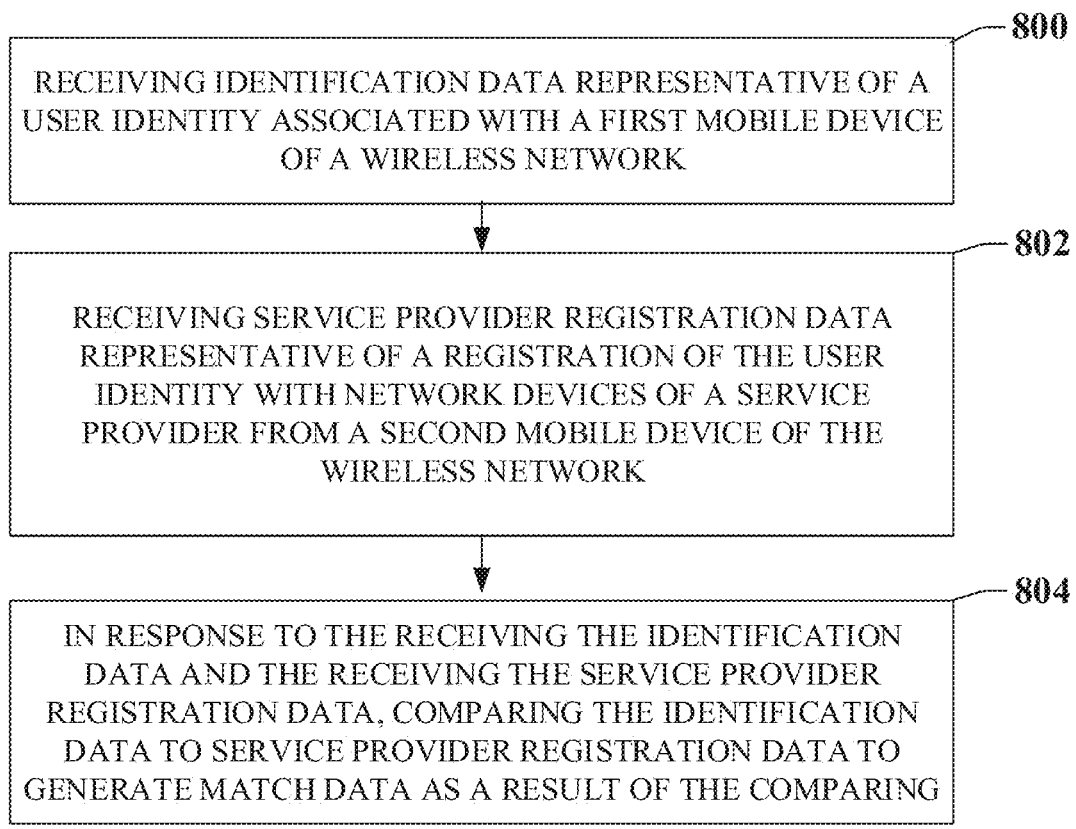
FIG. 8 illustrates an example flow diagram for a machine-readable medium for facilitating security for electronic subscriber identity modules for a 5G network according to one or more embodiments.

Referring now to FIG. 8, illustrated is an example flow diagram for a machine-readable medium for facilitating security for electronic subscriber identity modules for a 5G network according to one or more embodiments.

At element 800, a machine-readable medium that can perform the operations comprising receiving identification data representative of a user identity associated with a first mobile device (e.g., UE 102) of a wireless network. The machine-readable medium can perform the operations comprising receiving service provider registration data representative of a registration of the user identity with network devices (e.g., network node 106) of a service provider from a second mobile device (UE 104) of the wireless network at element 802. Furthermore, at element 804, the machine-readable medium can perform the operations comprising comparing (via the analysis component 302) the identification data to service provider registration data to generate match data as a result of the comparing in response to the receiving the identification data and the receiving the service provider registration data.

Figure 9:
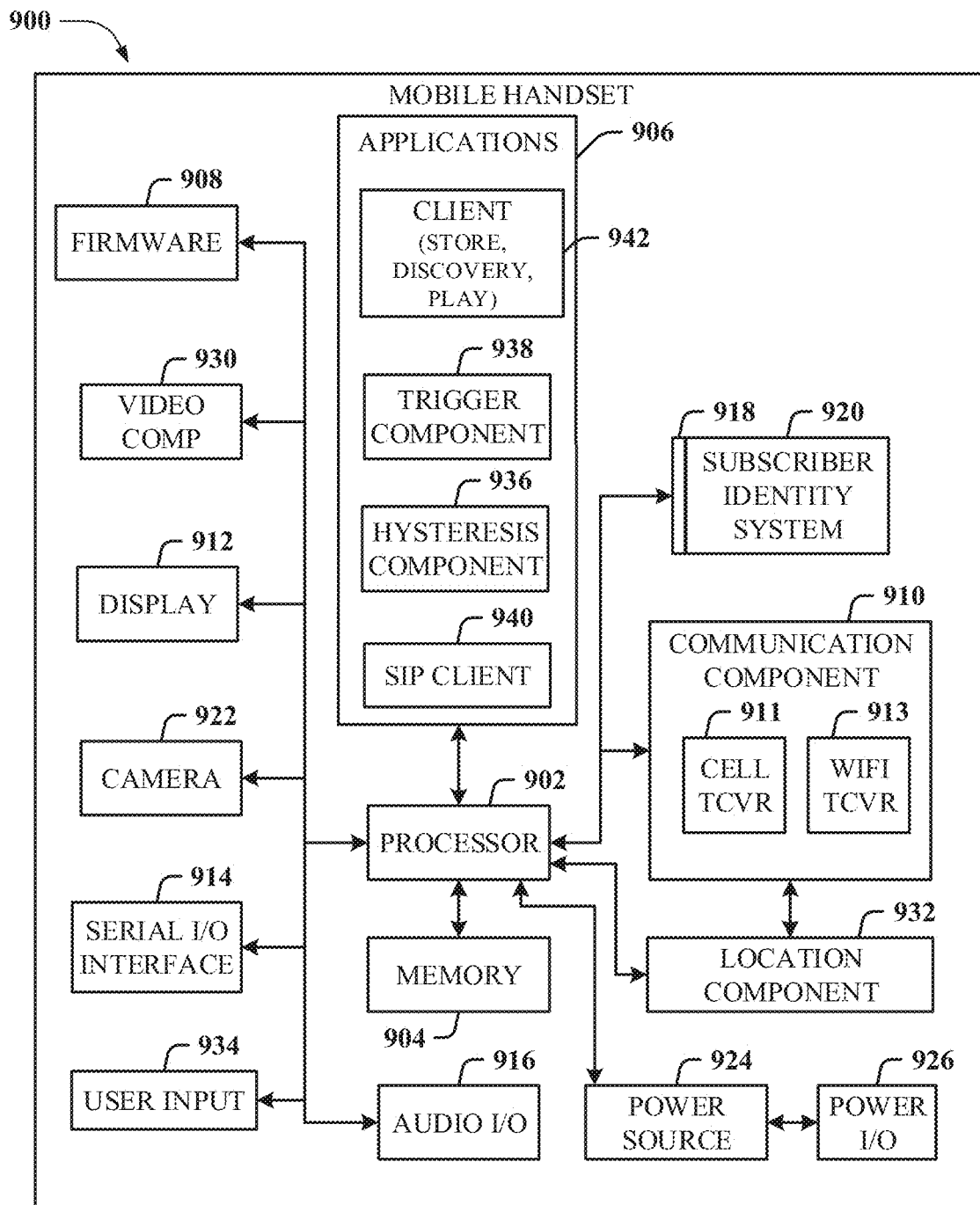
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
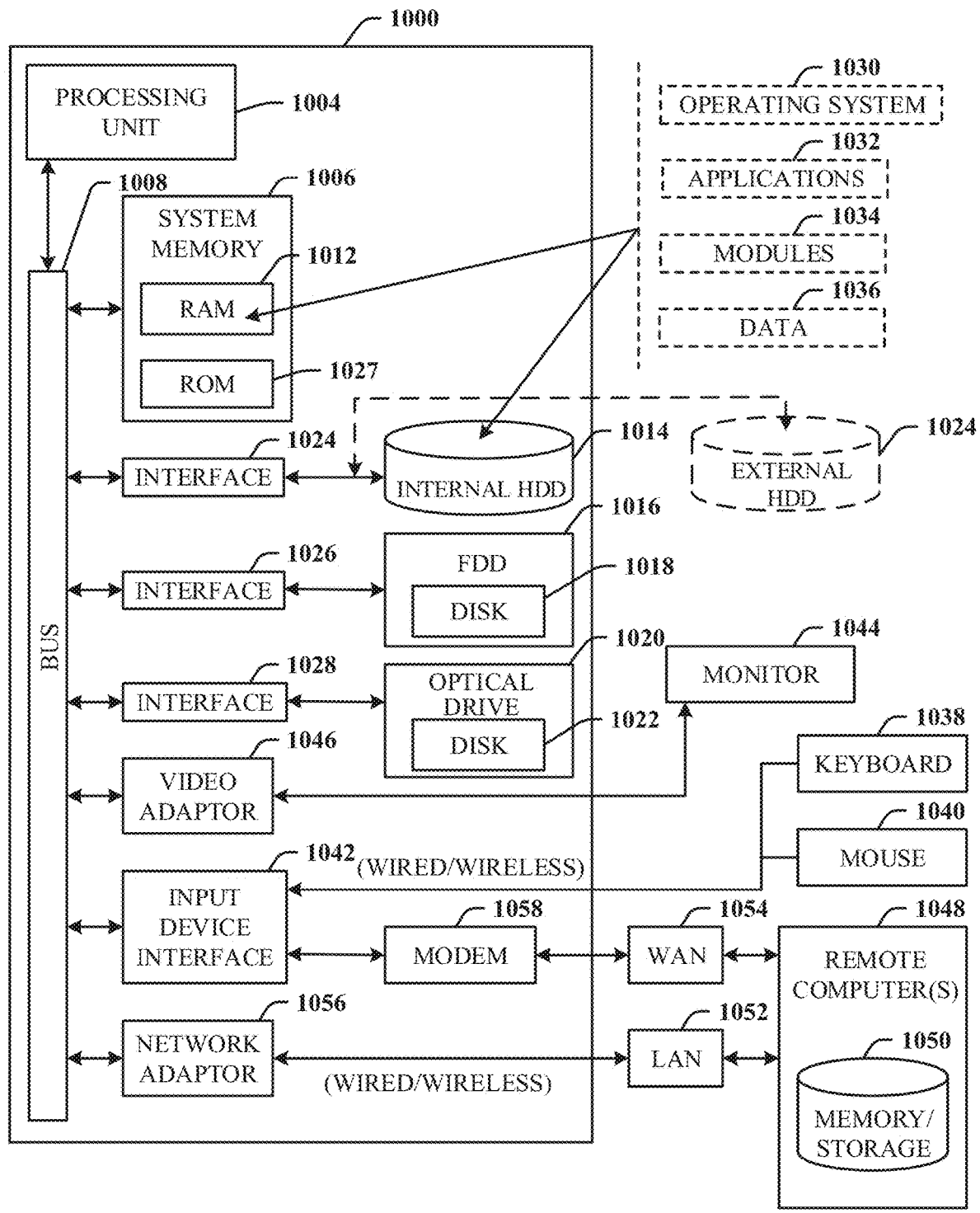
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown).

Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   assessing, by a user equipment comprising a processor, identification data representative of a user identity associated with the user equipment, wherein assessing the identification data comprises comparing a first text message associated with a birth date corresponding to the user identity to a second text message associated with the birth date corresponding to the user identity, resulting in verification data;
   based on a result of the assessing the identification data, facilitating, by the user equipment, correlating the identification data to service provider registration data to facilitate registering the user equipment with network equipment associated with a service provider identity of a service provider; and
   in response to a condition associated with correlating the identification data to the service provider registration data being determined to have been satisfied, prompting, by the user equipment, performance of an action to facilitate provisioning the user equipment via the network equipment associated with the service provider, wherein the action comprises requesting additional verification data that is not comprised in the verification data.

2. The method of claim 1, wherein prompting the performance comprises prompting, using the user identity, for additional identification data associated with the user identity that is not comprised in the identification data.

3. The method of claim 2, further comprising:
   in response to prompting the performance for the additional identification data, receiving, by the user equipment, the additional identification data associated with the user identity.

4. The method of claim 3, wherein the additional identification data comprises facial recognition data representative of a face associated with the user identity.

5. The method of claim 3, wherein the additional identification data comprises scan data representative of a scan of an identification card associated with the user identity.

6. The method of claim 3, further comprising:
   in response to receiving the additional identification data, sending, by the user equipment, the additional identification data to the network equipment.

7. The method of claim 6, further comprising:
   in response to sending the additional identification data to the network equipment, receiving, by the user equipment from the network equipment, electronic subscriber identity module data representative of an electronic subscriber identity module.

8. A system, comprising:
   a processor; and
   a memory that stores executable instructions that, when executed by the processor, facilitate performance of operations, comprising:
   receiving, from a user equipment via a network, identification data representative of a user identity associated with the user equipment, wherein the identification data comprises a comparison between a first text message associated with a birth date applicable to the user identity and a second text message associated with the birth date applicable to the user identity, resulting in verification data;
   receiving, from network equipment that is part of the network, service provider registration data representative of a registration of the user identity to use network services of the network associated with a service provider identity of a service provider;
   in response to receiving the identification data and receiving the service provider registration data, comparing the identification data to the service provider registration data; and
   in response to a condition associated with comparing the identification data to the service provider registration data being determined to have been satisfied, prompting performance of an action to provision the user equipment using the network equipment, wherein the action comprises requesting additional verification data.

9. The system of claim 8, wherein the operations further comprise:
   in response to a condition associated with comparing the identification data being determined to have been satisfied based on a result of the comparing, provisioning the the user equipment for communication via the service provider.

10. The system of claim 9, wherein provisioning the the user equipment comprises sending the the user equipment electronic subscriber identity data representative of an electronic subscriber identity module.

11. The system of claim 10, wherein the condition is a first condition, wherein the result is a first result, and wherein the operations further comprise:
    in response to a second condition associated with a second result of comparing the identification data being determined not to have been satisfied, denying access to the electronic subscriber identity data.

12. The system of claim 11, wherein denying the access to the electronic subscriber identity data is performed as a function of lapsed time between the first condition being determined to have been satisfied and the second condition being determined to have not been satisfied.

13. The system of claim 8, wherein comparing the identification data comprises the comparing of text message data to the service provider registration data.

14. The system of claim 8, wherein the operations further comprise:
    in response to comparing the identification data to the service provider registration data, facilitating downloading the electronic subscriber identity data to the the user equipment.

15. A non-transitory machine-readable medium, comprising executable instructions that, when executed by a processor, facilitate performance of operations, comprising:
    receiving identification data representative of a user identity associated with a first mobile device, wherein the identification data comprises a text message comprising a birth date associated with the user identity;
    receiving, from a second mobile device, service provider registration data representative of a registration of the user identity with network equipment of a network associated with a service provider from a second mobile device;
    in response to receiving the identification data and receiving the service provider registration data, comparing the identification data to service provider registration data to generate match data as a result of the comparing, and
    in response to a condition associated with the match data being determined to have been satisfied, prompting performance of an action by the network equipment to provision the first mobile device to use network services of the network associated with the service provider, wherein the action comprises requesting second verification data different than the first verification data.

16. The non-transitory machine-readable medium of claim 15, wherein the identification data is received from a software application of the first mobile device.

17. The non-transitory machine-readable medium of claim 15, wherein the operations further comprise:
   in response to generating the match data, sending electronic subscriber identity module data to the first mobile device.

18. The non-transitory machine-readable medium of claim 15, wherein the comparing is a first comparing, wherein the match data is first match data, and wherein the operations further comprise:
   in response to a second comparing of the identification data to the service provider registration data, wherein the second comparing is determined to have not generating second match data as a result of the second comparing, terminating an ability to use an electronic subscriber identity module of the first mobile device.

19. The non-transitory machine-readable medium of claim 18, wherein the operations further comprise:
   in response to the terminating the electronic subscriber identity module, requesting additional user identity data that is not comprised in the identification data.

20. The non-transitory machine-readable medium of claim 19, wherein the operations further comprise:
   in response to a condition associated with the additional user identity data being determined to have been satisfied, re-enabling the ability to use the electronic subscriber identity module of the first mobile device.

* * * * *